United States Patent [19]

Ueda

[11] Patent Number: 4,460,467
[45] Date of Patent: Jul. 17, 1984

[54] WATER PURIFICATION DEVICE
[75] Inventor: Yoshihiko Ueda, Yamaguchi, Japan
[73] Assignee: Takara Kogyo Co., Ltd., Tokyo, Japan; a part interest
[21] Appl. No.: 401,985
[22] Filed: Jul. 26, 1982
[30] Foreign Application Priority Data
  Mar. 12, 1982 [JP] Japan .................................. 57-39091
[51] Int. Cl.$^3$ ............................................ B01D 23/24
[52] U.S. Cl. .................................... 210/276; 210/274; 210/279; 210/291
[58] Field of Search ............... 210/289, 291, 269, 274, 210/275, 276, 279

[56] References Cited
U.S. PATENT DOCUMENTS
  4,379,750  4/1983  Tiggelbeck .......................... 210/289

Primary Examiner—Ivars C. Cintins
Attorney, Agent, or Firm—Wenderoth, Lind & Ponack

[57] ABSTRACT

In a water purification apparatus in which a granular filter medium is washed by agitation imparted to the filter medium, a pipe adapted for collection of purified water is mounted within the heap of precipitated granular filter medium and enclosed by a filter mesh to prevent outflow of the filter medium. Sliding contact elements such as turns of a wire wound about the collecting pipe or linear brush-like members inserted on the collecting pipe are also provided between the pipe and the filter mesh so that both the inner and outer surfaces of the filter mesh may be cleaned during countercurrent washing of the filter medium for assuring optimum water permeation at all times.

5 Claims, 9 Drawing Figures

WATER PURIFICATION DEVICE

FIELD OF THE INVENTION

This invention relates to a water purification apparatus and, more particularly, to such apparatus in which collection means for the filtered and purified water are enclosed by a filter mesh.

DESCRIPTION OF THE PRIOR ART

In the conventional purification apparatus, water collection means are provided with slits and the filtered and purified water is collected through these slits.

In such conventional water collection means, there exists such a problem that, if the slit width is increased, the granular filter medium such as filter sand may flow out through these slits and, if the slit width is decreased, a greater resistance is presented to the following water, resulting in the risk that the filter medium interstices may be completely stopped.

OBJECT AND SUMMARY OF THE INVENTION

It is therefore an object of the present invention to provide a water purification apparatus devoid of the above problems of the prior art. According to the present invention, there are provided water collecting means within the heap of precipitated granular filter medium, the water collecting means being enclosed by a filter mesh, and sliding contact means interposed between the water collecting means and the filter mesh, the sliding contact means coming into sliding contact with the inner surface of the filter mesh during washing.

DETAILED DESCRIPTION OF THE PREFERRED EMBODIMENTS

Figure 1:
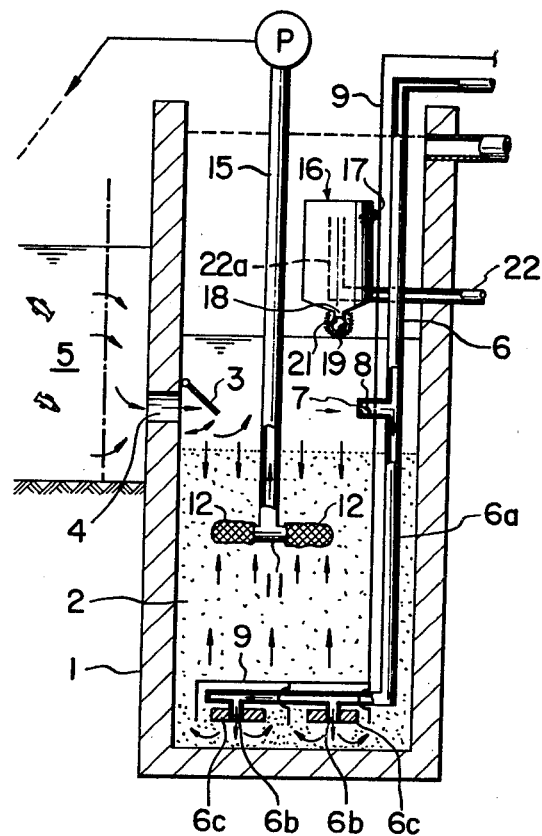
FIG. 1 is a longitudinal sectional view of the first embodiment of the water purification apparatus according to the present invention.
Figure 2:
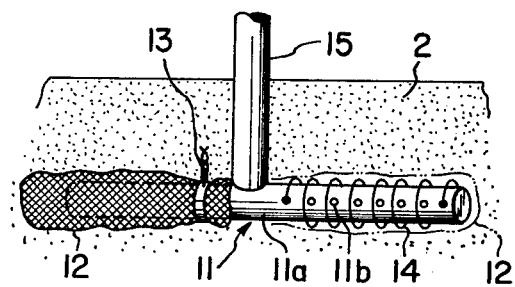
FIG. 2 is a partial front view showing only the water collection unit shown in FIG. 1.

FIGS. 1 and 2 illustrate the first embodiment of the invention as applied to a suction type water purification device. Referring to the structure of the device, the numeral 1 denotes a purification tank opened at the top. Granular filter medium 2 for purification of raw (unfiltered) water is filled to about the mid height of the purification tank 1. The granular filter medium may for example, be a filter sand consisting of a mixture of fine and coarse sands. An upper raw water inlet conduit 4 fitted with a check valve 3 is provided in the side wall of the tank 1 at a position slightly higher than the level of the granular filter medium 2. In the present case, the water purification device is installed within a fish pond 5 and the upper raw water inlet conduit 4 communicates with the fish pond 5. The numeral 6 designates a countercurrent washing pipe, and a raw water inlet port 8 having a check valve 7 opens into countercurrent washing pipe 6 at substantially the same height level as the upper raw water inlet conduit 4. The lower portion 6a of the countercurrent washing pipe below inlet port 8 serves as the lower raw water inlet conduit and extends into the heap of the granular filter medium 2. Near the bottom of the purification tank 1, inlet ports 6b open downward from washing pipe lower portion 6a. A plate 6c for defining an inlet chamber is fitted to each of the inlet ports 6b. A scrubbing air injection pipe 9 is mounted parallel to the countercurrent washing pipe 6 and branched into plural openings near the bottom of the purification tank 1.

A water collecting unit 11 is mounted to a suitable depth in the heap of the granular filter medium 2 for extraction of filtered water. In the example shown in FIG. 2, the water collecting unit 11 is formed as a water collecting pipe 11a having a plurality of water collection openings 11b. The pipe 11a is loosely wrapped with a tubular filter mesh 12 consisting, for example, of a nylon mesh cloth and tightened at the base or root portion thereof by a suitable wire 13 or like tightening means. A sliding contact member 14 consisting of a filamentary material wound spirally around the collecting pipe 11a is interposed between the collection pipe 11a and the filter mesh 12, said sliding contact member 14 slidingly contacting the inner surface of the filter mesh 12 during washing. A water outlet pipe 15 communicating with water collecting unit 11 is connected to a suction pump P. Thus, by virtue of the upper and lower raw water inlet conduits 4 and 6a and the water collecting unit 11 provided therebetween, the water purification device shown is designed as an upper and lower or upright suction type device.

A cylindrical separation vessel 16 is mounted in the upper zone in the purification tank 1 and has an inlet port 17 for discharge of water during countercurrent washing at an upper side portion and an outlet 18 for granular filter medium in the funnel-shaped bottom portion. A ball valve 19 is mounted in the outlet 18 for preventing entrance of countercurrent washing water. The ball valve 19 is made of floatable material and operates to stop the outlet 18 through its buoyancy. The numeral 21 denotes a mesh basket for capturing and safeguarding the ball valve 19 from occasional loss. In the central zone of the separation vessel 16, a tubular member 22a of a predetermined diameter which is opened at the top is suspendedly mounted and extends at its lower end through and out of the lower side wall portion of the separation vessel 16 so as to be used as a water discharge pipe 22.

The operation of the present embodiment will now be described by referring also to FIGS. 3 to 5.

For ordinary operation, that is, purification of raw water, the pump P is driven so as to place the water collecting unit 11 under negative pressure, the water collecting unit thus operating in suction. Part of the raw water (pond water) supplied through upper raw water inlet conduit 4 via check valve 3 is directly supplied in a downward stream through the upper surface of the heap of the granular filter medium towards the water collecting unit 11. Part of the raw water is also supplied through check valve 7 and raw water inlet 8 into the lower portion 6a of the countercurrent washing conduit 6 which is simultaneously used as a lower raw water inlet conduit, the raw water then flowing into the lower zone of the heap of the granular filter medium 2 through inlet ports 6b and flowing in an upward stream towards the water collecting unit 11. The raw water thus flows in a laminar flow through the heap from above and below so that any turbid content of the raw water may be removed by the granular filter medium 2 and the water is thus converted into purified (filtered) water to be again returned to the outside (fish pond 5) through the water collecting unit 11 and water outlet pipe 15.

Figure 3:
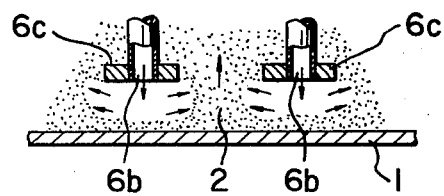
FIG. 3 is an enlarged longitudinal sectional view showing only the inlet portions of the lower raw water inlet conduit.
Figure 4:
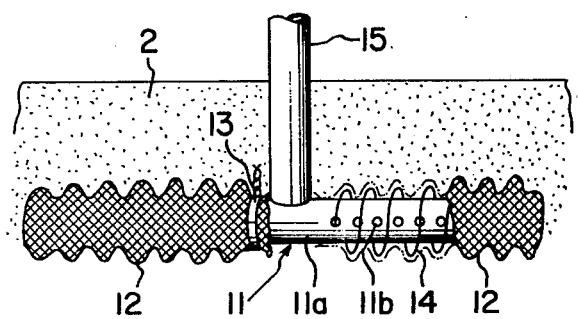
FIGS. 4 and 5 are partial front views for illustrating the operation of the water collecting unit shown in FIG. 2, with certain portions being broken away.

Adjacent to the inlet ports 6b in the lower portion of the heap of granular material 2, the nearby material 2 is pushed aside as shown in FIG. 3 under the urging force of water ejected from the inlet ports 6b, so that a hollow inlet chamber of unspecified shape is defined below each plate 6c. By such an inlet system, the inlet ports 6b cannot be stopped up with organic films or floating matter of coarse size contained in the raw water. In the water collecting means 11, the filter mesh 12 is held tightly onto the water collecting pipe 11a under negative pressure suction effects so that purified water may be sucked and collected through the filter mesh 12 while outflow of the granular material and stopping up of the water collection openings 11b are be prevented from occurring.

Countercurrent washing of the granular filter medium 2 is performed as follows: When the interstices of the granular filter medium are filled with impurities as a result of continued operation of the raw water purification system, filtration resistance is offered to the pump P which is thus subjected to a water head due to negative pressure. Upon detection of the phenomenon by a negative pressure gauge, purification operation is discontinued and the countercurrent washing operation started.

Thus, scrubbing air is injected from air injection pipe 9 upon opening of a suitable valve, not shown. Simultaneously, a small amount of water sufficient to fill air tunnels is introduced into the lower portion of the heap of the granular material by way of inlet ports 6b of the countercurrent washing conduit 6. The granular material 2 is agitated vigorously by the countercurrent washing water thus introduced and the turbid contents may be disengaged by mutual rubbing occurring in the granular material for 1 to 2 minutes, air injection is discontinued and a sufficient amount of countercurrent washing water is then supplied from countercurrent washing conduit 6 for about 2 to 3 minutes. By such countercurrent washing, turbid contents may be disengaged and removed nearly completely from the granular filter medium 2. It is to be noted that the check valves 3 and 7 are closed during such countercurrent washing.

Figure 5:
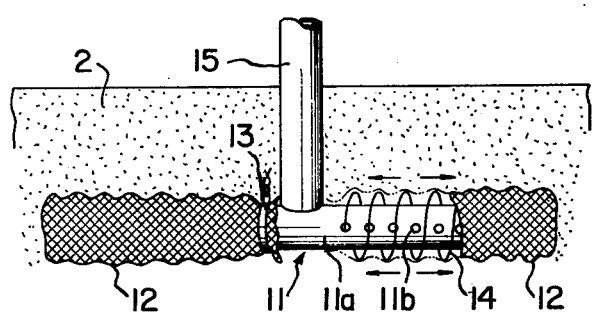

During such washing of the granular filter medium 2, the granular filter medium 2 and the filter mesh 12 at the water collection means 11 are rubbed against one another due to vigorous agitation of the granular filter medium 2 and resulting agitation of the filter mesh 12, in the form of to and fro movement thereof, as shown in FIG. 5, so that turbid contents or other adherent matter may be removed from the outer surface of the filter mesh 12. With agitation, e.g., to and fro movement, of the filter mesh 12, the filter mesh 12 is rubbed simultaneously against the spirally wound filamentary member, so that adherent matter on the inner surface of the filter mesh 12 may also be disengaged and removed. Thus, the washing of filter mesh 12 proceeds simultaneously and in parallel with the washing of granular filter medium 2 for recovery of water purification capacity.

As the countercurrent washing water is introduced, the water level in the tank 1 is elevated and reaches the inlet conduit 17 which opens into the separation vessel 16. Thus, the discharge water with entrained granular filter medium 2 flows into separation vessel 16 through inlet conduit 17. Polluted water thus introduced into separation vessel 16 descends along its inner wall in a spiral flow. The entrained granular filter medium is separated under a centrifugal force from the polluted discharge water and descends to the heap of granular filter medium. During countercurrent washing, the outlet 18 of the granular filter medium is closed by the ball valve 19 under the pressure of the countercurrent washing water. The polluted discharge water is reversed in direction at the bottom and directed upwards as spiral flow along the peripheral wall of the tubular member 22a to be discharged to the outside via the open end of the tubular member 22a and water discharge pipe 22. Since the tubular member 22a has a certain predetermined diameter, even supposing that part of the precipitated granular filter medium is entrained by the upward spiral flow of the discharge water along the peripheral wall of the tubular member 22a, the granular filter medium is centrifugally forced outwarding so that only polluted discharge water is discharged through discharge pipe 22. After completion of countercurrent washing, closure of the outlet 18 by the ball valve 19 is released so that precipitated granular filter medium descends to the heap of granular filter medium 2 in the purification tank.

A numerical example is given below.

A granular filter medium consisting of filter sand is provided to a depth of 100 cm in a concrete purification tank which is 80 cm across and 220 cm deep. Three such purification tanks are mounted in tandem in a vinyl house type eel pond, with water temperature increased to 27° C. The raw water was allowed to flow into the tanks spontaneously, with the water circulated for purification at a rate of 1500 m$^3$/day, 3 to 4 times per day. Turbid contents as well as ammonia excreted from fish were removed by continuous operation and optimum cleaning could be obtained with occasional countercurrent washing operations.

Figure 6:
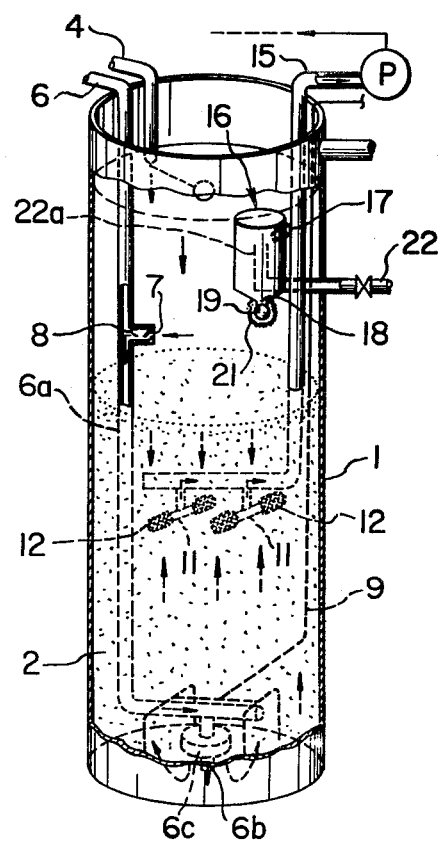
FIG. 6 is a perspective view showing a second embodiment of the invention.

Reference is made to FIG. 6 for illustration of the second embodiment of the invention. In FIG. 6 et seq., same or equivalent parts or portions to those shown in and described in connection with FIGS. 1 to 3 are designated by the same reference numerals and detailed description of these parts or portions has been omitted. In this modification, the upper raw water inlet conduit 4 is mounted in the upper open portion of the purification tank 1 to be installed outside of the pond. A drum can may be used as purification tank 1 with its upper cover removed. Components mounted in the tank 1 are inserted and mounted through the open upper part of the tank without providing openings or conduits in the lower half of the purification tank 1. Two water collecting units 11 are provided. In this modification, the structure may be simplified, thus providing greater economy. The operation of the present modification is substantially similar to that of the preceding first embodiment.

Figure 7:
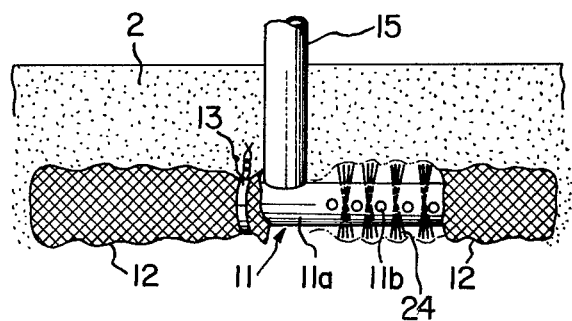
FIG. 7 is a front view showing a modified water collection unit.

FIG. 7 shows a modification of the water collection unit 11 in which sliding contact means 24 consist of a multiplicity of brush-like linear members mounted through opposite sides of the water collection pipe 11a. The operation of the water collection unit is substantially similar to that of the similar unit of the preceding first embodiment.

Figure 8:
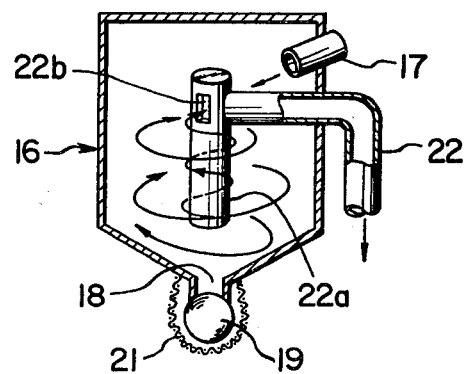
FIGS. 8 and 9 are longitudinal sectional views showing respectively modified separation vessels.
Figure 9:
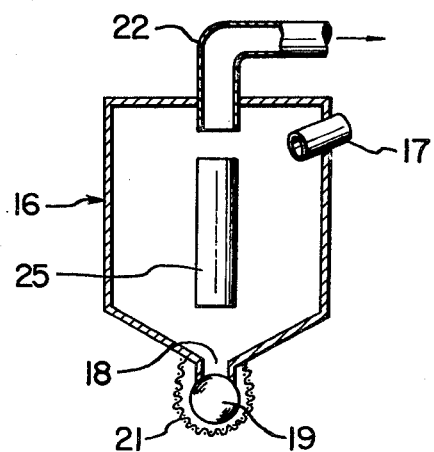

FIGS. 8 and 9 show modifications of the separation vessel 16. In the modification shown in FIG. 8, a tubular member 22a in suspended from the discharge pipe 22 so as to communicate therewith at the center of the separation vessel as in the preceding first embodiment of the invention. However, in the present modification, a discharge water outlet 22b is provided in the peripheral wall of the tubular member 22a in contrast to the preceding first embodiment. This modification has such an advantage that during counter washing operation, polluted discharge water spiraling around the tubular member 22a in separation vessel 16 tends to be directed towards the discharge water outlet 22b. In the modification shown in FIG. 9, a separate rod-like member 25 of a predetermined thickness is suspendedly mounted in the center of the separation vessel. The rod-like member 25 maybe of circular or polygonal cross-section may, and is mounted to the inner wall of the separation vessel 16 by brackets, not shown. Such suspended members of predetermined diameters need to be mounted in the vessel 16 and may be of various types within the scope of the invention.

According to the present invention, as described above, water collecting means are provided in the interior of the heap of granular filter medium and are enclosed by a filter mesh, while sliding contact means are provided between the water collecting means and the filter mesh for sliding contact with the inner surface of the filter mesh during washing. Thus, any outflow of the granular filter medium may be prevented by the provision of the filter mesh. Moreover, during countercurrent washing of the granular filter medium, the latter and the filter mesh itself are agitated and the sliding contact means may be activated so that both the inner and outer surfaces of the filter mesh can be washed simultaneously. Thus, optimum water permeation can be maintained at all times so that the filter medium is not be stopped up with impurities and the resistance to water flow through the filter medium is not be increased during purification.

What is claimed is:

1. A water purification apparatus in which a granular filter medium filters water to be filtered, comprising:
    a tank;
    means for providing water to be filtered into said tank;
    water collection means, disposed in said tank beneath the granular filter medium, for collecting water filtered in the granular filter medium;
    washing means, independent of said collection means, for injecting and removing washing water from said tank so as to agitate and wash the granular filter medium therein;
    a filter mesh loosely enclosing said water collection means so as to be movable thereover in response to contact with moving particles of the granular filter medium agitated by washing water during washing of the granular filter medium by said washing means;
    sliding contact means, interposed between said water collection means and said filter mesh, for slidingly contacting said filter mesh when said filter mesh moves during washing of the granular filter medium by said washing means, so as to disengage matter adhered to the inner and outer surfaces of said filter mesh.

2. The apparatus as claimed in claim 1, wherein said water collecting means is a water collecting pipe having plural water collecting through openings and wherein said sliding contact means is a filamentary member wound about said water collecting pipe.

3. An apparatus as in claim 2, wherein said through holes are linearly spaced along the length of said water collecting pipe and said filter mesh loosely covers said filamentary member and said holes such that said filter mesh is moved to and fro by the granular filter medium in rubbing contact with said filamentary member during washing of the granular filter medium by said washing means, whereby the outer surface of said filter mesh is agitated by said granular filter medium to disengage material adhering to said outer surface, and the inner surface of said filter mesh is simultaneously rubbed against filamentary material to disengage material adhering to said inner surface.

4. The apparatus as claimed in claim 1, wherein said sliding contact means comprises a multiplicity of brush-like linear members extending outwardly from said water collecting means.

5. An apparatus as in claim 4, wherein said water collecting means comprises a water collecting pipe having a plurality of through holes linearly spaced along the length thereof and said filter mesh loosely covers said brush-like linear members and said holes such that said filter mesh is moved to and fro by the granular filter medium in rubbing contact with said brush-like linear members during washing of the granular filter medium by said washing means, whereby the outer surface of said filter mesh is agitated by said granular filter medium to disengage material adhering to said outer surface, and the inner surface of said filter mesh is simultaneously rubbed against said brush-like linear members to disengage material adhering to said inner surface.

* * * * *